3,808,314
COBALT DODECENEDIOATE FOR TREATING
CANINE PYOMETRITIS
August J. Pacini, Los Angeles, Calif., assignor to Purex
Corporation, Ltd., Lakewood, Calif.
No Drawing. Application Jan. 22, 1970, Ser. No. 10,680,
now Patent No. 3,720,773, dated Mar. 13, 1973, which
is a division of application Ser. No. 715,167, Mar. 22,
1968, now Patent No. 3,542,826, dated Nov. 24, 1970.
Divided and this application Jan. 17, 1972, Ser. No.
218,612
Int. Cl. A61k 27/00
U.S. Cl. 424—295                          1 Claim

ABSTRACT OF THE DISCLOSURE

The cobalt salt of trans-dodecenedioic acid has been prepared and found to be a highly effective agent against canine pyometritis.

---

This application is a division of and incorporates by reference my earlier copending application, Ser. No. 10,680, now United States Pat. No. 3,720,773, issued Mar. 13, 1973, which application Ser. No. 10,680 is a division of and incorporates by reference earlier filed United States application No. 715,167, now U.S. Pat. No. 3,542,826 issued Nov. 24, 1970.

BACKGROUND OF THE INVENTION

Field of the invention

The invention is concerned with the cobalt salt of trans-dodecenedioic acid (TTA) and its use in the treatment of canine pyometritis.

Prior art

Aloe Vera in its unextracted form has been used for centuries for its vulnerary therapeutic effectiveness, particularly against burns. TTA is obtainable by exhaustive extraction of Aloe Vera or may be synthetically produced. The cobalt salt of TTA is a new compound.

SUMMARY OF THE INVENTION

It has now been discovered that the cobalt salt of TTA is vastly more effective than TTA or Aloe Vera in treatment of canine pyometritis.

DESCRIPTION OF THE PREFERRED EMBODIMENTS

Traumatic acid is also known as 1-decene-1,10-dicarboxylic acid and exists in cis and trans forms, the latter, hereinafter referred to as TTA, being the more biologically active.

TTA may be prepared as follows: Undecylenic acid is oxidized to hydroxyformoxyhendecanoic acid with hydrogen peroxide in formic acid which is then hydrolyzed to 10,11 - dihydroxyhendecanoic acid with sodium hydroxide. Treatment with periodic acid transforms the 10,11-dihydroxyhendecanoic acid into the sebacic semi-aldehyde which is condensed with malonic acid in the presence of pyridine. Upon acidification of the condensation mixture, 1-decane-1,10-dicarboxylic acid, i.e. traumatic acid, precipitates. This product is purified by recrystallization from a solvent. While the acid per se is biologically active, the cobalt salt is many times more active.

Salts of TTA are prepared by replacement of the carbonyl hydrogen with cobalt from a suitable metal salt, e.g. carbonate, acetate, chloride and the like, e.g. cobalt carbonate.

Quantities of traumatic acid or salt employed are typically quite small. Thus as little as 0.00005 percent are suitable.

The cobaltous TTA is applied topically in a suitable carrier e.g. liquids such as water, physiological saline, aqueous alcohol, or in ointments, salves, creams, lotions which are pharmaceutically acceptable and either inert or possessed of beneficial properties themselves.

Preparation of TTA

A one liter three-necked flask is equipped with a mechanical stirrer, a thermometer and a dropping funnel. In the flask are placed 184 g. (1 mole) of undecylenic acid and 200 g. (4.15 moles) of formic acid. The stirrer is started and the reaction mixture is warmed by a water bath to 40° C. for at least one-half hour longer after all the peroxide has been added.

The reaction mixture is transferred to a suitable flask for vacuum distillation and the formic acid and any water is removed by distilling under full vacuum of the water pump. The residual hydroxyformoxyhendecanoic acid is now ready for hydrolysis. This is accomplished by boiling for one hour and acidified to a pH of 2, or slightly lower with 6 N hydrochloric acid. After cooling well in an ice bath, the solid acid is collected on a Buchner funnel (pre-chilled), washed with ice water and sucked as dry as possible. The solid is dried in a vacuum desiccator over flake sodium hydroxide, 205.0 g. of product equal to 93.92% of the theoretical yield were obtained.

A solution of 42.78 g. (0.2 mole) of sodium metaperiodate ($NaIO_4$) in 600 ml. of 1 N sulfuric acid is prepared. In a 1 liter flask equipped with a mechanical stirrer, a thermometer and a dropping funnel are placed 400 ml. of ethanol and 43.6 g. (0.2 mole) of 10,11-dihydroxyhendecanoic acid. This solution is warmed to 40° C. and the periodate solution is added through the separatory funnel at a rapid rate while stirring the mixture. The temperature is maintained at 40° C. for 30–40 minutes after which the solution is cooled to 20° C., and any inorganic salts that separated were collected on a Buchner funnel, sucked dry and washed with ether to remove adherent organic material.

The ether washing is used to extract the aqueous filtrate along with additional ether as may be needed. A total of three extractions with about 200 ml. of ether in each extraction should be used. The combined ether extract is shaken with a small amount of anhydrous sodium sulfate to remove most of the water, after which the ether is distilled. The residual oil is then submitted to the full vacuum of a water pump to remove any alcohol and water remaining. An oily residue sebacic semi-aldehyde, weighing 3.0 g. is obtained. (96.77% of theoretical yield.) This product is used in the next step without further purification.

18.6 g. (0.1 mole) of the sebacic semi-aldehyde is mixed with 11.45 g. (0.11 mole) of malonic acid and 10.28 g. (0.13 mole) of pyridine in a 500 ml. round bottom flask. The mixture is allowed to stand for 24 hours at room temperature and then heated for 5 hours on a steam bath. The mixture is then cooled and diluted with about 10 volumes of water. Upon acidification to pH 2 with 2 N sulfuric acid and chilled to near 0° C., the crude 1-decane-1,10-dicarboxylic acid is collected on a Buchner funnel. It is sucked dry and washed with a small amount of ice cold water. Dry in a vacuum desiccator over flake caustic. The crude trans-1-decene-1,10-dicarboxylic acid, weighing 18.0 g., is recrystallized twice from boiling solvent. The yield is 11.49 g. (50.33% of theory).

The dicarboxylic acid obtained in this fashion has a molecular formula $C_{12}H_{20}O_4$, molecular weight 228.28, melts at 161°–165° C., when crystallized from ethyl acetate, contains an unsaturated linkage, is very sparingly soluble in water but fairly soluble in alcohol, ethyl acetate, benzol, chloroform, ether, glycerin, propylene glycol, is acid and shows a neutralization equivalent of 115, indicating dibasicity.

Similar acids to TTA have been identified by plant physiologists as among the many factors involved in plant growth phenomena, and numerous closely allied acids have been synthesized e.g. having formulas of the type $HOOC(CH_2)_nCH=CHCOOH$ and $$HOOC(CH_2)_n=CHCH_2COOH$$

The following dicarboxylic acids failed to effect any acceleration of wound healing in experimentally induced wounds in rabbit ears over controls in opposite ears as opposed to the transdodecanedioic acid, which speeds up repair appreciably: 1-nonene-1,9-, 2-nonene-1,9-, 2-decene-1,10-, 1-tridecene-1,13-, and 2-tridecene-1,13 - dicarboxylic acid.

The cobalt salt of TTA is far more effective than TTA.

It is noteworthy that transdodecenedioic acid is the therapeutically effective in the treatment of diseases of animals namely canine pyometritis.

Preparation of TTA cobalt salt

Three hundred milligrams of TTA were dissolved in 300 millimeters of boiling distilled water. An excess of cobalt carbonate, 250 milligrams, was added to the boiling solution, forming a pink-violet slurry. After 10 minutes of continued boiling, and filtering, the filtrate was evaporated to about 150 millimeters and let stand overnight. Two sets of crystals formed the first, on the bottom of the container, were long (1.3 millimeters) and ruby-red. The second set were colorless and floated on the filtrate liquid. The ruby-red crystals were separated by decanting the other crystals and filtrate and dried on unglazed porcelain. After recrystallization from distilled water, a yield of 90 milligrams of ruby-red powder was realized. Quantitative analysis revealed a cobalt content in the powder of 20.58%. In close agreement with a single cobalt salt of TTA (theor.: 20.593%).

Cobalt dodecendioate is therapeutically effective in microgram dose, whether applied topically in any convenient compatible formulation preferably free of inhibiting antimetabolites, or injected in solution form, or administered perorally, or included in rectal or vaginal suppository form, or as a micro- or other clyama.

A completely unpredicted effect of the salt is its action toward infections in animals.

Aside from its use alone, either the cobalt TTA may be used in admixture with other medication and presented in the form of soaps, ointments, lotions and such other forms as are common to the dispensation of drug and medicated cosmetic formulations.

I claim:

1. Method of treating canine pyometritis which comprises applying topically to the canine in need of said treatment cobaltous transtraumatate in an effective amount for treating canine pyometritis.

References Cited

UNITED STATES PATENTS 2,339,259    1/1944    English et al. _____ 260—535

OTHER REFERENCES

Noller: Chemistry of Organic Compounds, W. B. Saunders Co., Philadelphia, 1965, p. 181.

JEROME D. GOLDBERG, Primary Examiner